Sept. 24, 1929.   A. M. SERGESON   1,729,524

SHUTTLE

Filed April 18, 1928

Inventor,
Allan M. Sergeson,
by his Attorneys,
Howson & Howson

Patented Sept. 24, 1929

1,729,524

UNITED STATES PATENT OFFICE

ALLAN M. SERGESON, OF ROSLYN, PENNSYLVANIA

SHUTTLE

Application filed April 18, 1928. Serial No. 270,929.

This invention relates to improvements in shuttles, and relates more particularly to improvements in means for adjusting the yarn tension.

The principal object of the invention is to provide a tensioning device having a novel and improved form of adjusting means.

Another object of the invention is to provide adjusting means which shall function also to retain the tensioning spring in a predetermined operative position with respect to the parts with which it is immediately associated.

A still further object of the invention is to provide a spring formed in novel fashion to facilitate removal or replacement.

Figure 1:
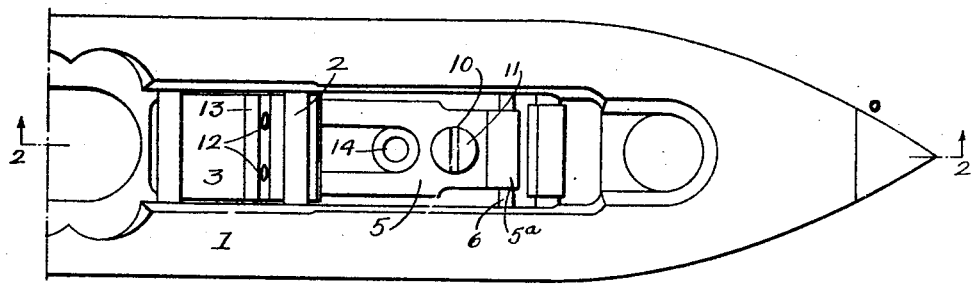
Figure 1 is a plan view of one end of a shuttle showing sufficient of the parts to afford an understanding of the present invention.
Figure 2:
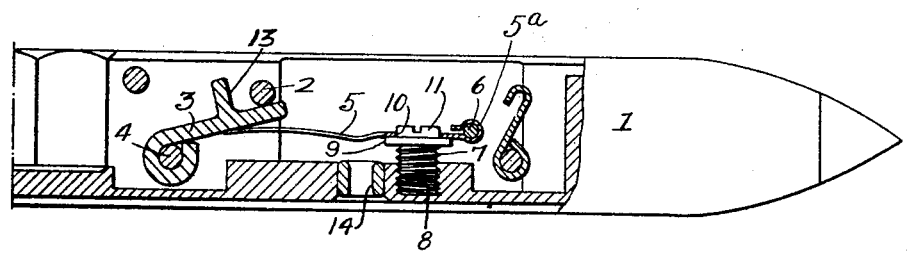
Fig. 2 is a partial section on the line 2—2, Fig. 1.
Figure 3:
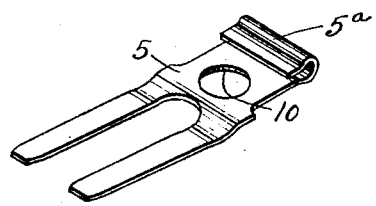
Fig. 3 is a view in perspective of the tensioning spring.

Referring to the drawings, 1 represents the body of the shuttle which may be of standard form. Towards one end and in the interior thereof the shuttle comprises a yarn-tensioning device which comprises in a preferred form a transverse pin 2 and a member 3 mounted on a transverse pivot pin 4 and whose outer end underlies the pin 2 and is resiliently held thereagainst by means of a spring 5. The spring 5 is bifurcated in the present instance for a purpose hereinafter set forth and is pivotally held at one end on a pin 6 extending transversely across the interior of the shuttle. In the present instance, the spring is formed with a resilient hook 5ª at the end through which the pin 6 extends, and this hook provides for quick detachment or replacement of the spring, when this is necessary, without removal of the pin 6 from the shuttle by forcibly springing the hook over the pin.

Intermediate the pin 6 and the outer end of the spring 5 the spring is engaged on its under side by an adjustable tensioning element consisting of a screw 7 threaded into a recess 8 in the floor of the shuttle. Immediately above the screw, the spring 5 is apertured, as indicated at 10, to afford access to the upper slotted end of the screw for adjustment purposes, the aperture 10 being somewhat smaller than the screw to obtain an operative contact between the screw and the spring. Obviously, by adjusting the screw in the recess the tension of the spring on the member 3 may be regulated.

In the present instance the screw is provided with a flange 9 which abuts the under side of the spring, and with an extension 11 which projects through the aperture 10 in the spring. Preferably the recess 8 is of greater depth than the length of the screw 7 below the flange 9, so that as the screw is turned downwardly in the recess, the flange will function to prevent the bottom of the screw coming into contact with the bottom of the recess. Possible splitting of the shuttle under the recess by forcing the screw against this relatively thin part is thus avoided. The screw extension 11, which projects into the aperture 10 in the spring, preferably neatly fits the aperture whereby the spring is held relatively fixed against transverse movement on the pin 6. The screw thus functions both as a means for regulating the resilient pressure of the spring against the member 3, and as an anchor for preventing transverse movement of the spring in the shuttle.

The yarn in practice extends through an aperture 12 in an upward projection 13 of the member 3, thence between the pin 2 and the underlying opposed extremity of the member 3, and from this point downwardly through an eyelet or opening 14 in the bottom of the shuttle. By means of the device described above, the tension placed upon the yarn as it passes between the cooperating relatively adjustable and opposed members 2 and 3 may be adjusted as desired by turning the screw 7 up or down in the recess 8. This adjustment of the screw may be accomplished by simply inserting a tool in the slot at the upper end of the screw which is exposed through the opening 10 in the spring. In turning down the screw, there is no danger that the bottom of the screw may be forced with dangerous pressure against the bottom of the recess 8 by reason of the flange 9 which limits the downward movement of the screw. In order to obtain a proper functioning of the spring and to preclude the possibility of the spring interfering with the free movement of the yarn through the eye 14, it is desirable that this spring maintain its original position, in which the side edges thereof are clear of the walls of the shuttle, and with the eyelet 14 uniformly disposed between the arms of the spring, as illustrated in Fig. 1. By extending the screw upwardly through the aperture 10 as described above, the spring-adjusting screw is made to function as an anchor to retain the spring in the desired position and to prevent either transverse or longitudinal displacement thereof.

It is apparent that the invention is capable of other embodiments than that illustrated, and it will be understood that no limitations are imposed other than as set forth in the appended claims.

I claim:

1. In a shuttle, a yarn-tensioning device comprising relatively movable opposed elements between which the yarn passes, a spring resiliently forcing one of said elements toward the opposed element to confine the yarn therebetween, a screw threaded in the shuttle and underlying and confined by the spring, said spring being apertured to provide access to the screw for adjustment, and a projecting part of said screw extending through the aperture.

2. In a shuttle, the combination with a shuttle body having an opening therein for passage of yarn, a tensioning device for said yarn including opposed yarn-engaging elements relatively movable with respect to each other, a bifurcated spring engaging one of said elements to hold it against the other, said spring being so arranged that the said shuttle aperture lies between the bifurcations of the spring, an adjusting screw underlying and confined by the spring for adjusting the tension of the latter with respect to said yarn-engaging elements, and means whereby said screw functions also to prevent transverse movement of said spring with respect to said shuttle opening.

3. In a shuttle, a yarn-tensioning device comprising a flat apertured spring, and a screw threaded in said shuttle and engaging the under side of said spring and having a part projecting into said aperture.

4. In a shuttle, a yarn-tensioning device comprising a flat apertured spring pivotally mounted at one end, and a screw threaded into the shuttle and contacting with the under side of said spring intermediate the ends thereof and having a part projecting through said aperture, said screw being adjustable through said aperture to regulate the tension of said spring and also anchoring the spring against transverse movement in the shuttle.

5. In a shuttle, a yarn-tensioning device comprising a flat pivoted spring, and spring-adjusting means underlying and confined by the spring and anchoring the spring against transverse and longitudinal movement in the shuttle.

6. In a shuttle, a yarn-tensioning device comprising a flat spring, a pin extending transversely of the shuttle, a resilient hook on the spring adapted to be sprung over the pin whereby the latter functions as a pivot around which the spring may be adjusted, and a spring-tensioning screw anchoring the spring in the shuttle and preventing accidental detachment thereof from the pivot pin.

7. In a shuttle, a yarn-tensioning device comprising a flat spring, a pin extending transversely of the shuttle, a resilient hook on the spring adapted to be sprung over the pin whereby the latter functions as a pivot around which the spring may be adjusted, and a releasable anchor element in the shuttle normally positively preventing accidental displacement of the spring from the pivot pin.

ALLAN M. SERGESON.